April 5, 1955
G. C. WYMAN
2,705,389
GLASS CUTTING MACHINE
Filed March 19, 1954
4 Sheets-Sheet 1
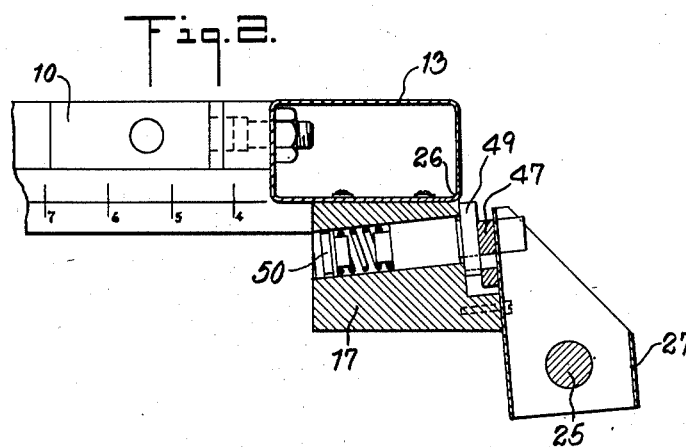
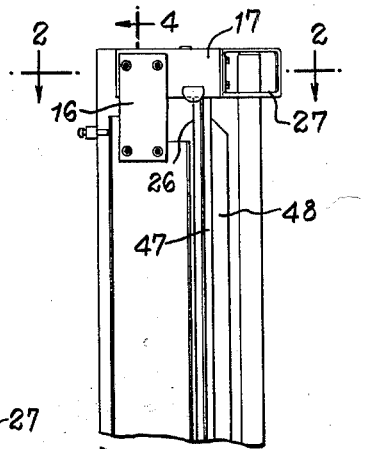
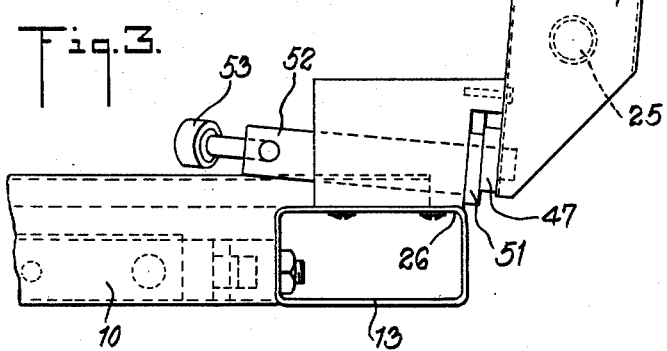
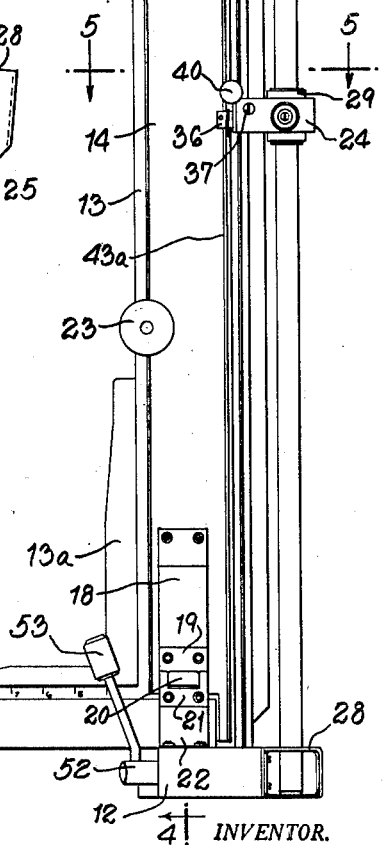
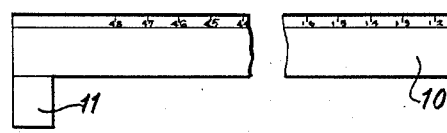
INVENTOR.
BY Guy C. Wyman
Benj. T. Rauber
his attorney April 5, 1955 G. C. WYMAN 2,705,389
GLASS CUTTING MACHINE
Filed March 19, 1954 4 Sheets-Sheet 2
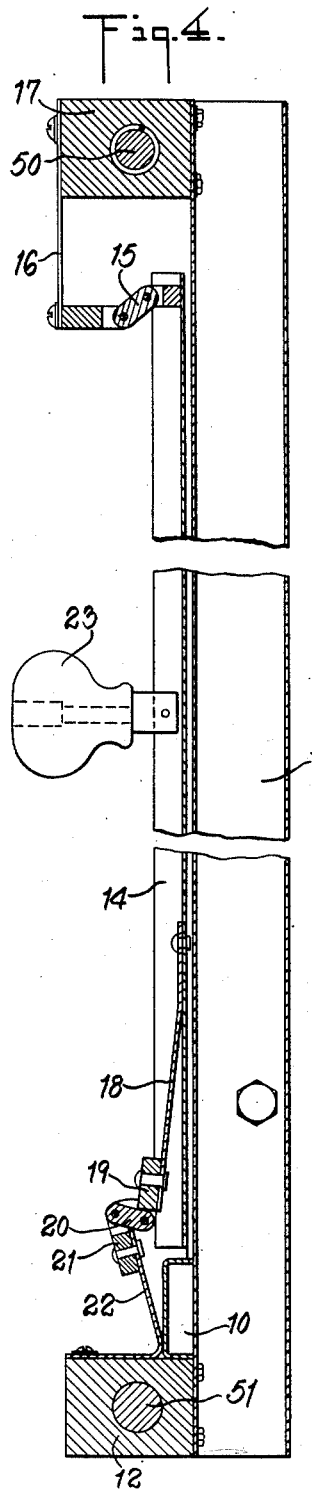
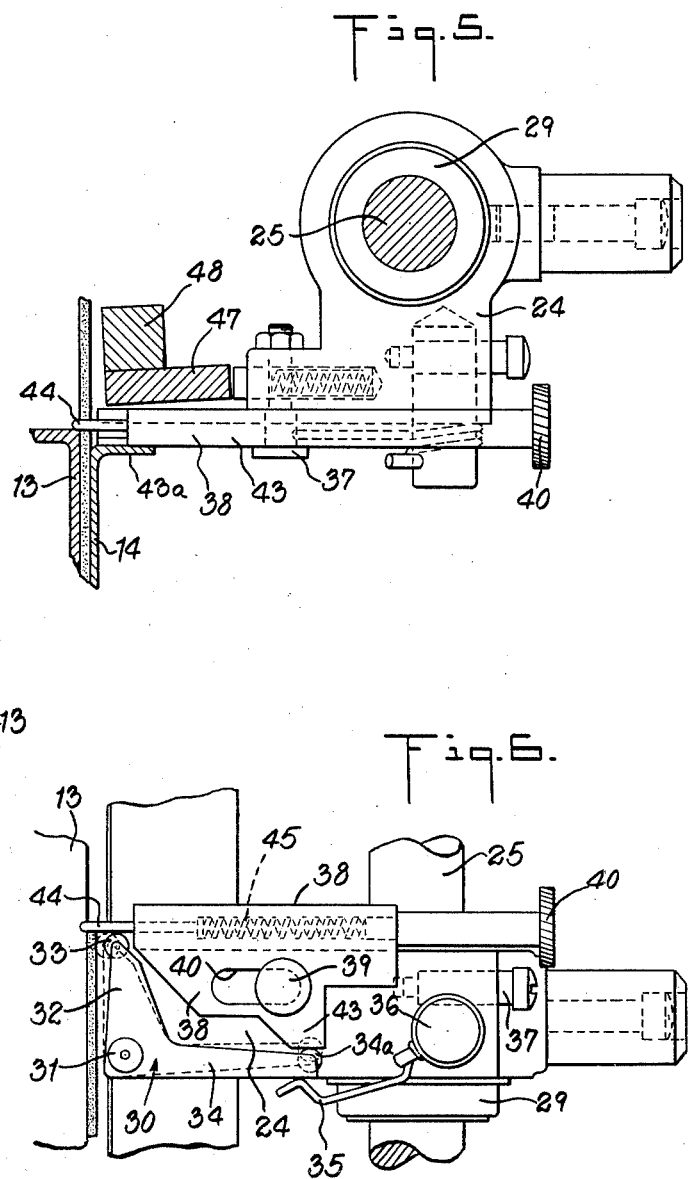
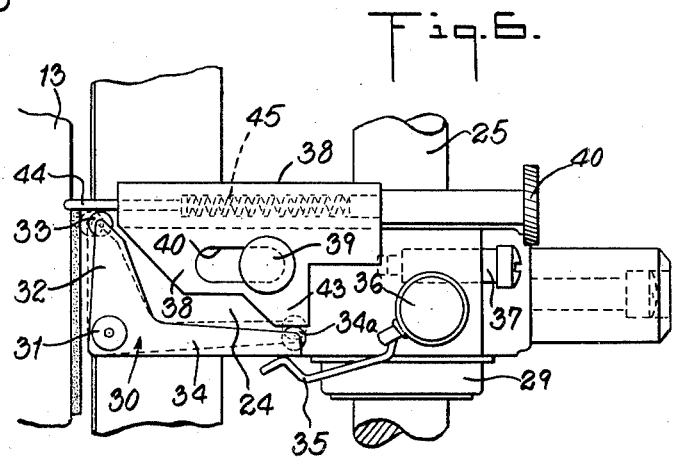
INVENTOR.
Guy C. Wyman
BY Benj. T. Rauber
his attorney

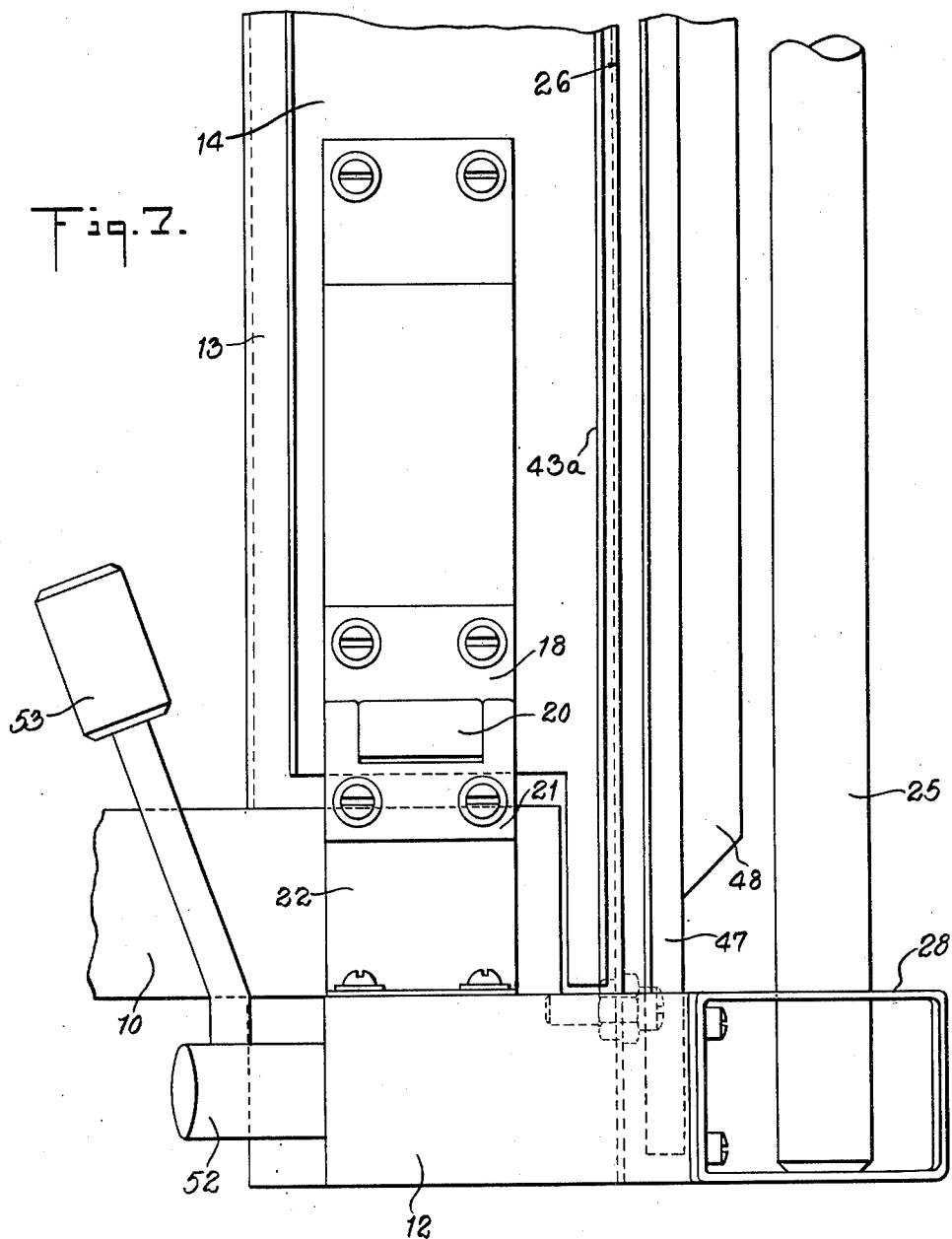

April 5, 1955  G. C. WYMAN  2,705,389
GLASS CUTTING MACHINE
Filed March 19, 1954  4 Sheets-Sheet 4
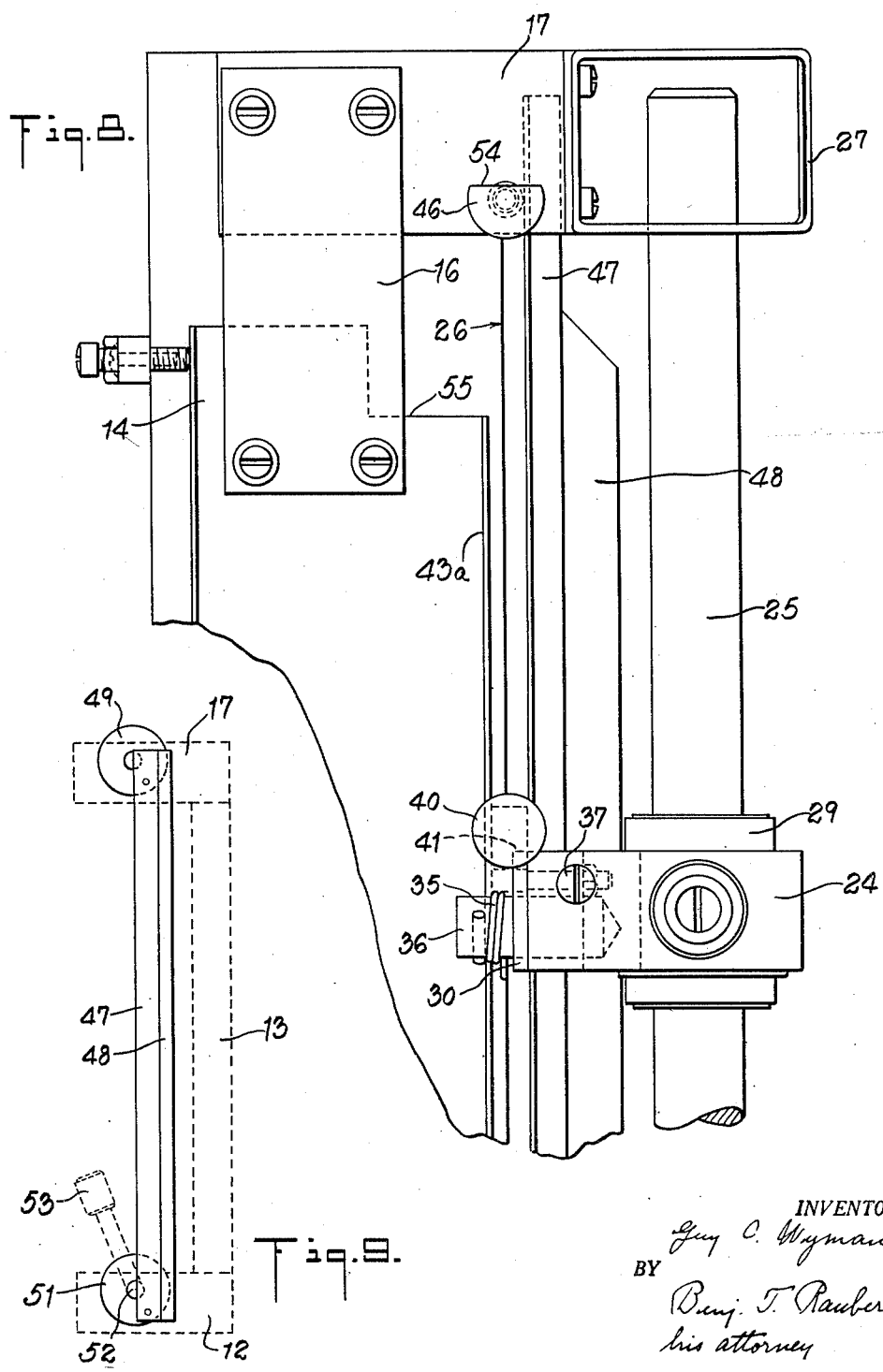

2,705,389

GLASS CUTTING MACHINE

Guy C. Wyman, West Orange, N. J., assignor to Red Devil Tools, Irvington, N. J., a corporation of New Jersey Application March 19, 1954, Serial No. 417,446

12 Claims. (Cl. 49—48)

My invention relates to a glass cutting machine for cutting sheets of glass to a measured dimension.

In cutting a sheet of glass, the sheet is clamped in position, scored at the line on which it is to be cut and then broken along this line by pressure applied, as by a breaker bar, just beyond the scored line. To ensure a clean uniform severance of the sheet at the scored line it is desirable that the start of the scoring shall be just short of the edge from which the scoring starts, that is, that the scoring shall start very closs to this edge but shall not intersect it. It is also desirable that a uniform pressure shall be applied to the cutter and so selected with respect to the hardness of the glass as to score the glass to the optimum depth for the breaking or severance by the pressure bar. Pressure by the pressure bar on the glass beyond the scored line is preferably applied initially near one end of the scored line and then progressively along the line so that the glass will separate progressively from one end of the scored line to the other.

My invention provides a machine by which these requirements will be accomplished automatically.

In the machine of my invention the sheet of glass to be cut is supported at its lower edge on a supporting beam, to be mounted horizontally, and, at the place of cutting, is supported by a backing beam or plate in vertical position relative to the supporting beam. These beams form a supporting frame for the sheet of glass. A straight breaking edge is formed on the vertical backing beam. The sheet is firmly and uniformly held against the backing beam by a clamping plate or bar near the breaking edge. This clamping bar is pressed against the sheet of glass by a spring pressed linkage that may be withdrawn to enable the sheet of glass to be shifted along the horizontal supporting beam and may then be released to press against the sheet of glass.

When the sheet is thus clamped in position it is scored lengthwise of the breaking edge of the backing beam by a cutter mounted on a carriage that slides vertically at the breaking edge of the frame. The cutter is normally pressed into contact with the sheet of glass by a spring with a pressure that may be adjusted. The spring pressure is, however, uniform throughout the length of the cut or score. The carriage is slidably mounted on a rail extending vertically parallel to the breaking edge and to the plane of the backing beam, insuring a uniform movement of the carriage relative to the plane of the glass and to the breaking edge.

To insure that the scoring shall start at a short distance below the upper edge of the sheet of glass and shall not intersect this edge, a sliding stop is arranged on the carriage just above the cutter and is spring pressed to project past the plane of the glass when it passes the upper edge of the glass and at the same time to withdraw the cutter from contact with the sheet of glass. To move the carriage downward so that the glass may be scored, the stop abutting the upper edge of the glass is withdrawn thus permitting the cutter to rest against the face of the glass at just the proper distance below the upper edge as set by the positions of these parts on the carriage and with the pressure set by an adjustable spring, whereupon the cutter may be drawn downwardly scoring the glass to its lower edge.

Specifically this relative movement of stop and cutter is obtained by pivotally mounting on the carriage a cutter having an arm carrying a cutter wheel and extending upwardly from the pivot and a horizontal arm to be engaged and depressed by a projection or cam surface on the stop slide to tilt the cutter arm away from the glass when the stop slide is moved to the glass and to release it when the stop slide is withdrawn. The stop slide carries a stop pin spring pressed so that when the glass is shifted for a new cut the slide may be pressed in toward the sheet to withdraw the cutter so that it will not score the glass when being moved to the top edge of the glass for a new cut.

Preferably the supporting and guide rail for the cutter carriage is cylindrical and the carriage may therefore rotate about this rail on its longitudinal axis to enable replacement of a worn cutter wheel. The carriage is held normally in proper position by contact with a straight edge or face of the clamping bar. To permit the carriage to rotate on the rail the clamping bar has a cut away space at its upper end into which the carriage may move and thus be free of the clamping bar and thus to rotate. The carriage is normally prevented from moving into this space by a displaceable stop.

The breaker bar is mounted beyond the breaking edge of the frame on eccentrics, one at the upper end and one at the lower end. The lower eccentric is actuated by a handle while the upper eccentric is actuated by the breaker bar but is held back slightly by a spring so that the breaking pressure is applied first at the lower end and then progressively upwardly.

The various features of the invention are illustrated by way of example in the accompanying drawings in which:

Fig. 1 is a front elevation of a glass cutting machine embodying a preferred form of the invention;

Fig. 2 is a section of the machine on the line 2—2 of Fig. 1;

Fig. 3 is a bottom plan view;

Fig. 4 is a vertical section on line 4—4 of Fig. 1;

Fig. 5 is a horizontal section on line 5—5 of Fig. 1;

Fig. 6 is a side elevation of the carriage and parts of the frame;

Fig. 7 is a front elevation on a larger scale of the lower part of the machine;

Fig. 8 is a front elevation on a larger scale of the upper part of the machine, and Fig. 9 is an elevation on a smaller scale of the breaker bar mechanism.

In the embodiment shown in the accompanying drawings, the frame comprises a supporting beam 10 to rest in a substantially horizontal position on supporting blocks 11 and 12 and to support a sheet of glass resting with its lower edge on the upper face of the beam. A vertical backing beam 13 is secured to the rear face of the supporting beam and at a right angle to it against which the rear face of the sheet of glass rests. The beams 10 and 13 are braced at their junction by an angle member 13a. A sheet of glass placed on the supporting beam may be moved lengthwise thereof to project past the line of scoring or cutting and the length of the sheet supported on the beam may be determined by divisions of inches or other measurement, measuring from the cutting line as shown in the drawings.

When the sheet of glass is placed in position on the frame it is clamped against the backing beam 13 by a clamping plate 14 mounted by linkages at its upper and lower ends to swing toward the beam 13 with a spring action. To this end the upper end of the clamping plate 14 is pivotally secured to one end of a link 15, Fig. 4, the other end of which is secured to a plate 16 depending from a block 17 mounted on the upper part of the backing beam 13. The lower part of the clamping plate is secured through a leaf spring 18 and hinge plate 19 to one end of a link 20, the other end of which is secured by a hinge block 21 to a leaf spring 22 mounted on the supporting beam 10. Normally the links 15 and 20 diverge very slightly toward the clamping plate so that the spring 22 exerts a pressure on the clamping plate 14 to hold the glass against the vertical backing beam 13. A knob 23 is provided on the clamping plate which may be grasped and pushed upwardly, both links rotating counterclockwise, until the lower link 20 tilts upwardly and the clamping plate is pulled outwardly. Reverse movement presses the clamping plate to the position shown in Fig. 4. The sheet of glass thus clamped is ready for scoring or cutting.

The cutting elements for scoring the glass are mounted on a carriage 24 having a collar through which passes a cylindrical vertical rail 25 spaced forwardly of the plane of the backing beam 13 and to the right of the edge 26, which forms the breaking edge. The rail 25 is parallel to the plane of the backing beam 13 and to a sheet of glass backed thereon and to the cutting edge 26 and is mounted at its upper end in a bracket 27 on the block 17 and at its lower end in a bracket 28 secured to the supporting block 12. A ball bearing 29 is mounted within the collar of the carriage 24 to insure smooth sliding on the rail without binding.

A cutter 30, Fig. 6, is pivoted by a pivot 31 to a vertical face of the carriage 24 and comprises a vertical arm 32 bifurcated at its upper end to carry a cutter disc 33 and a horizontal arm 34 carrying at its end a roller 34a to be engaged by a projection or cam face of the stop slide. The cutter 30 is pressed counterclockwise about the pivot 31 by contact with one end of a coil spring 35 coiled about a stud 36, Figs. 5 and 6, and secured thereto at its other end. The stud 36 is rotatable to adjust the tension of the spring and is secured in its adjusted positions by a screw 37. The cutter wheel is thus pressed into contact with the glass sheet uniformly by the pressure determined by the spring 35.

The cutter 30 is rotated clockwise from the position shown in broken lines, in Fig. 6, to a position shown in full lines, and the cutter wheel thus withdrawn from contact with the glass by a stop slide 38 slidably secured to the carriage 24 by a pin 39 extending through a horizontal slot 40 in the slide. The stop slide has also a horizontal flange slidable on the upper edge of the carriage as indicated at 41 in Fig. 8 to guide it in its horizontal movement. The stop slide may thus slide horizontally toward or from the glass sheet within the limits set by the slot 40. It may be slid back and forth by means of a knob 42 secured to it. The stop slide has a projection from its lower end to form an inclined or cam portion 43 to engage the roller 34a and tilt the cutter 30 to the position shown in full lines in Fig. 6. To prevent the carriage 24 from rotating about the axis of the rail 25 in the normal operation of the machine an edge of the stop slide 38 abuts and slides along a flanged edge 43a of the clamp bar 14, as shown particularly in Fig. 5, said edge 43a forming a straight edge for the carriage.

The stop slide 38 is provided with a stop pin 44 extending horizontally toward the supporting beam 13 and slidably mounted in a bore in the slide. The pin 44 is pressed toward the beam 13 by a coil spring 45 so that it may be pressed back when in contact with the face of the sheet of glass when the slide is in the full line position of Fig. 6.

The action of the slide and cutter is as follows:

When the carriage 24 is moved upwardly to a stop 46, Fig. 8, the stop pin 44 will just clear the upper edge of a sheet of glass to be cut. When the slide is pushed to the position shown in Fig. 6, the stop pin 44 projects above the edge of the sheet of glass and the carriage may be lowered until the stop pin 44 rests on the upper edge of the sheet of glass, as indicated in Fig. 6, and cannot be lowered further while the slide is in this position. The cutter wheel 33 is just below the upper edge of the sheet. To move the cutter to contact with the sheet of glass the slide and its stop pin must be withdrawn to clear the plane of the glass. This moves the cam edge 43 of the slide out of the path of the roller 34a, permitting the cutter to be rotated counterclockwise by the spring 35 into contact with the surface of the glass. The carriage may now be drawn downward below the lower edge of the glass sheet while the cutter wheel scores the glass on the line of severance.

When the cutter wheel passes below the lower edge of the glass it springs below this edge so that when a new sheet of glass is to be cut the cutter must be withdrawn by a clockwise rotation. To do this the stop slide 38 is moved toward the sheet, tilting the cutter clockwise until the cutting wheel clears the surface of the sheet of glass, the stop pin 44 meanwhile touching the surface of the glass and being displaced against the action of the spring 45. The carriage, cutter and stop may now be moved upwardly to the stop 46 without danger of scoring the glass. When the carriage reaches its uppermost position the stop pin 44 is pushed by the spring 45 past the upper edge of the sheet of glass and the machine is then ready for another cut.

After the glass sheet has been scored the part of the sheet projecting beyond the scored line is bent backwardly to break it along the scored line, the glass being backed at the breaking edge 26. For this purpose a breaker bar 47 is mounted at the position shown in Figs. 5, 6, 2, 3 and 8, and is slightly inclined to the plane of the glass sheet so that its edge will move more nearly into plane contact with the sheet of glass as it bends to the breaking point. The breaker bar is stiffened by a bar 48 terminating short of the ends of the breaker bar. Above the bar 48 the breaker bar is pinned to an eccentric 49, indicated in Fig. 9, journalled in the block 17 and connected to a spring 50, Fig. 2, to resist or retard rotation. Below the lower end of the bar 48 the breaker bar is similarly pinned to an eccentric 51 having a shaft 52 journalled in the lower block 12. The shaft 52 is rotatable by a handle 53. Upon rotation of the handle 53 downwardly, clockwise in Fig. 9, the eccentric 51 is rotated to press the breaker bar against the projecting part of the glass sheet while the eccentric 49 is rotated in the same direction by the breaker arm itself but with a very slight lag due to the resistance of the spring 50. This enables the breaking pressure to be applied progressively from the bottom to the top of the sheet.

When the cutter wheel 33 becomes worn and must be replaced, the stop 46 is rotated until a chord portion 54 is lowermost and permits the carriage to be raised until it clears the lower edge 55 of a cut out portion of the clamping bar 14. The carriage 24 may then be rotated forwardly on the axis of the rail 25 until the cutter 30 and cutter wheel 33 are accessible for removal of the wheel.

The operation of the apparatus is briefly as follows:

A sheet of glass is placed on the supporting beam 10 and moved to a position thereon corresponding with the length to be cut as indicated by the scale on this beam. It is then clamped against the backing beam 13 by pressing the clamping bar 14 inwardly and downwardly until the links assume the position shown in Fig. 4 so that the clamping bar is pressed against the glass by the action of the spring 18. If the carriage 24 is below the lower edge of the glass sheet it is moved upwardly until stopped by contact of the cutter disc 33 with the lower edge of the sheet. The stop slide 38 is then pushed toward the glass, the stop pin contacting the face of the sheet and being pressed back against the action of the spring 45 while the cam edge 43 of the slide riding over the roller 34a tilts the cutter 30 clockwise, Fig. 6, and lifts the cutter disc 33 free from the surface of the glass sheet. The carriage may now be raised until the stop pin 44 is pushed by the spring 45 past the upper edge of the glass sheet. Preparatory to scoring the glass the carriage is moved down until the stop pin 44 rests on the upper edge of the glass. Then the slide 38 is moved away from the surface of the glass, enabling the cutter 30 to tilt counterclockwise until the cutter disc presses against the surface of the glass just below its upper edge with a pressure determined by the tension of the spring 35. The carriage may now be drawn downwardly sliding on the rail 25 and being kept from rotating on the axis thereof by contact of the face of the slide 38 against the straight edge face 43a of the clamping bar 14.

The handle 53 of the breaker bar eccentric is now moved downwardly rotating the eccentric 51, moving the breaker bar 47 downwardly and against the part of the glass sheet projecting past the scored line and breaking it, the upper eccentric 48 following the rotation of the eccentric 51 and giving the breaker bar a motion substantially of translation.

To replace a cutter wheel 33 the stop 46 is rotated a half turn to bring the chord 54 lowermost, the carriage 24 is raised until the stop slide and cutter pass into the space in the clamping bar 14 and clear of the upper end of the straight edge 43a whereupon the carriage may be rotated on the axis of the rail to a position at which the cutter wheel is freely accessible.

In operation the cutter wheel touches and begins to score the glass sheet only just below the upper edge of the sheet and cannot intersect this edge. The cutter applies a uniform, selected pressure of the cutting wheel on the surface of the glass sheet.

Having described my invention, what I claim is:

1. A glass cutting machine which comprises a frame having a supporting beam to be mounted horizontally to support a sheet of glass at its lower edge and a backing for said sheet of glass having a breaking edge positioned vertically relative to said supporting beam, a cutter supporting rail parallel to said breaking edge, a clamping means to clamp a sheet of glass against said backing adjacent said breaking edge, a carriage slidable vertically on said cutter supporting rail, a glass cutter pivotally mounted on said carriage to swing into cutting contact with a sheet of glass on said frame at said breaking edge, a spring pressing said cutter to swing into engagement with said sheet of glass, a retractable stop slide on said carriage slidable toward said glass sheet and having a cam surface to engage said cutter to tilt it from said sheet of glass and a stop rod movable on said retractable stop slide and spring pressed to move past the plane of said glass sheet when said retractable stop slide is not retracted.

2. The glass cutting machine of claim 1 in which said carriage is rotatable on the axis of said rail and in which said clamping means has a guiding surface parallel to said breaking edge to be contacted by said cutter carriage and to prevent said carriage from rotating on the axis of said rail.

3. The glass cutting machine of claim 2 in which said c'amping means has a space to permit rotation of said cutter carriage and a removable stop to prevent said cutter carriage entering said space.

4. The glass cutting machine of claim 1 having a breaker bar at the side of said cutter carriage farthest from said clamping means, a pair of eccentrics spaced lengthwise of said breaker bar and a handle to rotate the lower of said eccentrics.

5. The glass cutting machine of claim 1 in which said clamping means comprises a clamping bar, a pair of swinging links connected, one to each end of the clamping bar, and a leaf spring between one link and the clamping bar.

6. A glass cutting machine which comprises a frame for supporting a sheet of glass and having a breaking edge, a cutter supporting rail parallel to the plane of said frame at said breaking edge, a carriage slidably mounted on said rail and extending toward the plane of said frame, a cutter pivoted on said carriage and having a cutter arm tiltable to contact with a sheet of glass supported on said frame and an actuating arm extending at an angle to said cutter arm, a spring to tilt said cutter toward said frame, a retractable slidable stop having a stop pin spring pressed to move past the plane of a sheet of glass on said supporting frame, said slide having a projection to engage the actuating arm of said cutter and swing it away from cutting position when said stop slide is moved to project said pin past the plane of the sheet of glass and to release said cutter when said stop slide is retracted.

7. The machine of claim 6 having means to vary the pressure of said spring on said cutter.

8. The machine of claim 6 having a breaker bar spaced from the plane of said sheet of glass and in which said stop slide is pressed into contact with said breaker bar.

9. The machine of claim 6 in which said carriage is rotatable about the axis of its supporting rail and in which said machine has a straight edge bar slidably engaged by said carriage.

10. The machine of claim 6 in which said carriage is rotatable about the axis of its supporting rail, said machine having a clamping bar spring pressed to hold a sheet of glass on said frame and having a straight edge engaged by and guiding said carriage.

11. The machine of claim 10 in which said clamping bar has a space at the end of said straight edge to permit said carriage to rotate about the axis of its rail when moved into said space and a stop movable to prevent movement of said carriage into said space.

12. A glass cutting machine having a frame for supporting a sheet of glass in a plane and having a breaking edge, a cutter to score said glass at said breaking edge, a clamping bar to press a sheet of glass on said frame, a supporting plate spaced from the upper part of said frame, a link pivoted at one end to said plate and at the other end to the upper part of the clamping bar, a spring mounted on said frame near the lower part of said clamping bar, a leaf spring mounted on the lower part of said clamping bar and a link connecting said springs, said upper and lower links diverging toward said clamping bar.

References Cited in the file of this patent

UNITED STATES PATENTS

| | | |
|---|---|---|
| 1,610,547 | Burda | Dec. 14, 1926 |
| 2,538,901 | Fancher | Jan. 23, 1951 |